United States Patent
Barrass

(10) Patent No.: US 9,919,606 B2
(45) Date of Patent: Mar. 20, 2018

(54) VEHICLE CONTROLLER AND METHOD OF CONTROLLING A VEHICLE

(71) Applicant: Sevcon Limited, Gateshead (GB)

(72) Inventor: Peter Barrass, Gateshead (GB)

(73) Assignee: Sevcon Limited, Gateshead (GB)

( * ) Notice: Subject to any disclaimer, the term of this patent is extended or adjusted under 35 U.S.C. 154(b) by 0 days.

(21) Appl. No.: 15/379,984

(22) Filed: Dec. 15, 2016

(65) Prior Publication Data

US 2017/0096068 A1    Apr. 6, 2017

Related U.S. Application Data

(63) Continuation of application No. 14/770,486, filed as application No. PCT/GB2014/051517 on May 16, 2014, now Pat. No. 9,527,387.

(30) Foreign Application Priority Data

May 20, 2013    (GB) .................... 1309072.5

(51) Int. Cl.
*B60L 3/08*    (2006.01)
*B60L 15/20*    (2006.01)
(Continued)

(52) U.S. Cl.
CPC ................ *B60L 3/08* (2013.01); *B60L 15/20* (2013.01); *B66F 9/07572* (2013.01); *B66F 9/24* (2013.01);
(Continued)

(58) Field of Classification Search
CPC ...................................................... B60L 3/08
See application file for complete search history.

(56) References Cited

U.S. PATENT DOCUMENTS 8,126,618 B2 *    2/2012    Yamada ................ B60K 28/04
                                                                    180/273
2005/0236208 A1    10/2005    Runkles et al.
(Continued)

FOREIGN PATENT DOCUMENTS

EP    1813569    8/2007
GB    2413547    11/2005
(Continued)

OTHER PUBLICATIONS

Combined Search and Examination Report under Sections 17 & 18(3).

*Primary Examiner* — Alex C Dunn
(74) *Attorney, Agent, or Firm* — Woodard, Emhardt, Moriarty, McNett & Henry LLP

(57) ABSTRACT

An electric motor control unit for controlling the operation of an electric motor. The unit comprises: an electric motor controller comprising a processor having at least one input and at least one output, wherein an output of the processor is coupled to a power provider for controlling power to an electric motor; a tilt accelerometer system comprising a tilt accelerometer for determining a measure of the tilt of the electric motor unit relative to a reference orientation, wherein the tilt accelerometer system comprises an output for providing a signal based on the determined measure of the tilt; wherein the output of the tilt accelerometer system is coupled to an input of the processor of the electric motor controller; wherein the power provider comprises a power output for controlling the operation of an electric motor based on the output of the tilt accelerometer system.

20 Claims, 3 Drawing Sheets

(51) Int. Cl.
  *B66F 9/075* (2006.01)
  *B66F 9/24* (2006.01)
  *B66F 17/00* (2006.01)

(52) U.S. Cl.
  CPC .......... *B66F 17/003* (2013.01); *B66F 17/006* (2013.01); *B60L 2200/42* (2013.01); *B60L 2240/16* (2013.01); *B60L 2240/20* (2013.01); *B60L 2250/16* (2013.01)

(56) References Cited

U.S. PATENT DOCUMENTS

| | | | | |
|---|---|---|---|---|
| 2007/0208483 | A1* | 9/2007 | Rabin | G05D 1/0891 701/72 |
| 2008/0201044 | A1* | 8/2008 | Yamada | B60K 28/04 701/50 |
| 2008/0319710 | A1* | 12/2008 | Hsu | G01G 19/083 702/174 |
| 2009/0157266 | A1* | 6/2009 | Krimbacher | B66F 9/07509 701/50 |
| 2010/0114415 | A1* | 5/2010 | Arnsby | B60L 3/0076 701/22 |
| 2010/0127840 | A1 | 5/2010 | Chen | |
| 2011/0042164 | A1* | 2/2011 | Clark | B66F 17/006 182/2.2 |
| 2011/0303475 | A1 | 12/2011 | Kim | |
| 2012/0109437 | A1* | 5/2012 | Iwase | B66F 9/24 701/22 |
| 2012/0265388 | A1* | 10/2012 | Bissontz | B60L 1/003 701/22 |
| 2012/0328395 | A1* | 12/2012 | Jacobsen | B25J 3/04 414/1 |

FOREIGN PATENT DOCUMENTS

| | | |
|---|---|---|
| JP | 1995084773 | 11/1993 |
| JP | 2001199696 | 7/2001 |
| JP | 2010190583 | 9/2010 |
| JP | 2012214124 | 11/2012 |
| WO | WO02/066281 | 8/2002 |
| WO | WO2004/009396 | 1/2004 |
| WO | WO2008/022067 | 2/2008 |
| WO | WO2010/121711 | 4/2010 |

\* cited by examiner

VEHICLE CONTROLLER AND METHOD OF CONTROLLING A VEHICLE

BACKGROUND

The present disclosure relates to electric motor controllers and to the control of vehicles, and more particularly to safety control of load lifting vehicles.

Vehicles having aerial work platforms, such a "cherry-pickers" and materials handling vehicles, such as fork lift trucks are used to lift and to carry loads. To avoid the vehicles tipping over it has been proposed to limit the maximum speed of such vehicles when the vehicle is turning. In addition, tilt switches may be used to identify a loss of stability of the vehicle. Such switches may also be used to stop the vehicle from being driven, or lifting loads when the vehicle is tilted or tilting.

Aspects and examples of the present disclosure address related technical problems.

SUMMARY

In one aspect there is provided an apparatus for controlling operation of a load bearing vehicle. The apparatus comprises: a turning input for obtaining an indication of the turning of the vehicle with respect to its direction of travel; a speed input for obtaining the linear speed of the vehicle in the direction of travel; an acceleration input for obtaining an accelerometer signal; and a controller configured to determine the tilt angle of the vehicle based on the turning, the linear speed, and the accelerometer signal, and to modify operation of the vehicle based on the tilt angle. The accelerometer signal may provide an indication of the direction of gravity to enable tilt angle to be measured with respect to the direction of gravity, for example the accelerometer input may receive a measure of acceleration from a micro-electromechanical MEMS tilt accelerometer. As will be appreciated, the term "linear speed" does not imply that the vehicle is travelling is a straight line, but may refer to the instantaneous speed as a vehicle is cornering. As an example, the liner speed may be determined by the wheel rotation rate.

The vehicle may comprise a vehicle having a load bearing lift, operable to lift a load to a selected height which may be above the unloaded centre of gravity of the vehicle. For example, the vehicle may comprise a material handling vehicle such as a fork lift truck, or an aerial work platform such as a cherry picker. The load may comprise a person.

By knowing the angle that a vehicle is at and in some cases additional information about the weight, height and/or lateral position of the load with respect to the vehicle, operation of the vehicle can be modified to assist safety, for example to provide a warning signal to an operator of the vehicle, or to limit the speed of the vehicle or operation of the lift.

A MEMs accelerometer can be used to determine acceleration as a 3D vector, e.g. with respect to three (3) mutually perpendicular axes. This enables a determination of the direction in which gravity is acting with respect to the vehicle and hence the angle or tilt of the vehicle.

Another aspect provides an electric motor control unit for controlling the operation of an electric motor, the unit comprising: an electric motor controller comprising a processor having at least one input and at least one output, wherein an output of the processor is coupled to a power provider for providing power to an electric motor; a tilt accelerometer system comprising a tilt accelerometer for determining a measure of the tilt of the electric motor control unit relative to a reference orientation, wherein the tilt accelerometer system comprises an output for providing a signal based on the determined measure of the tilt; wherein the output of the tilt accelerometer system is coupled to an input of the processor of the electric motor controller; and wherein the power provider comprises a power output for controlling the operation of an electric motor based on the output of the tilt accelerometer system. The power provider may be an inverter, or a power stage for an electric motor.

Providing a tilt accelerometer system in an electric motor control unit together with the electric motor controller can enable the electric motor controller to take into account quickly and reliably the tilt angle of the control unit in order to control operation of the motor. In particular, with the tilt accelerometer provided in the electric motor control unit, the orientation of the tilt accelerometer relative to the unit is fixed and known. This can make calibration of the tilt accelerometer more straightforward and more accurate and hence can make compensation for tilting accurate and reliable. The provision of an electric motor control unit can also simplify the fitting of the components to a vehicle and ensure that the output of the tilt accelerometer is correctly coupled to the electric motor controller.

According to another aspect, there is provided a method of controlling the operation of an electric motor for a vehicle, the method comprising: coupling to the vehicle in a fixed orientation an electric motor control unit, the electric motor control unit comprising an electric motor controller and a tilt accelerometer system, the tilt accelerometer system comprising a tilt accelerometer; coupling an output of the electric motor controller to a control input of the electric motor to control the operation of the electric motor; and calibrating the tilt accelerometer to define the direction of a gravitational force acting on the tilt accelerometer relative to the fixed orientation of the electric motor control unit.

Hence the method may enable control of an electric motor for a vehicle to be adjusted based on a measure of the tilt of the control unit, which is coupled to the vehicle. Calibration of the unit after it is fixed to the vehicle enables the unit to be fixed to the vehicle in any convenient orientation before a "zero" orientation is defined.

In some possibilities, a reference orientation is determined by calibration of the tilt accelerometer when the electric motor control unit is secured in a fixed position relative to the vehicle, and in some cases when it is in a fixed position relative to the electric motor.

DESCRIPTION OF THE DRAWINGS

Embodiments of the invention will now be described, by way of example only, with reference to the accompanying drawings in which.

DETAILED DESCRIPTION

Embodiments of an electric motor control unit will first be described with reference to FIGS. 4A and 4B. The use of such a control unit on vehicles, in particular load-bearing vehicles such as aerial work platforms and fork lift trucks, will then be described.

Figure 4A:
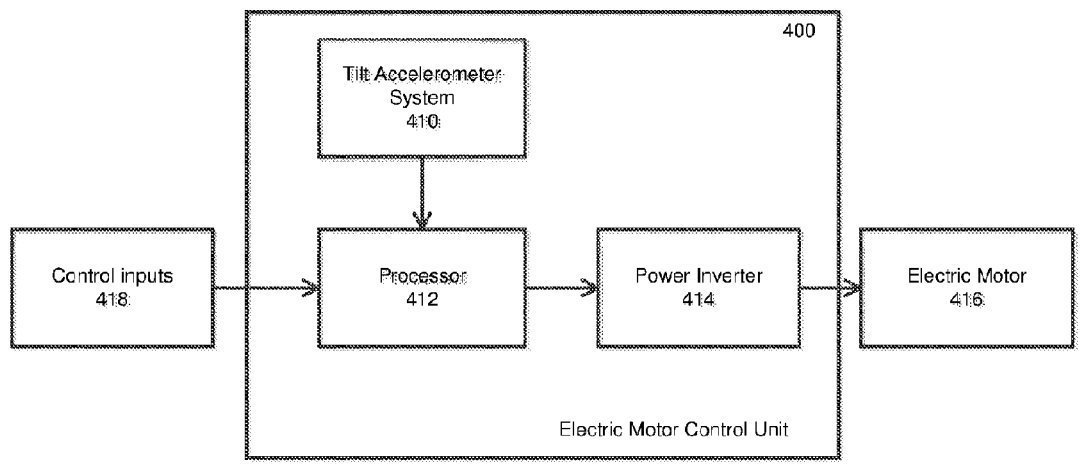
FIG. 4A is a schematic diagram of an electric motor control unit according to one embodiment.

As illustrated schematically in FIG. 4A, an electric motor control unit 400 may include, in one embodiment, a power provider 414 for providing power to an electric motor 416. The type of power provider 414 used will depend on the motor that is being controlled, but for example, an inverter such as a 3 phase power inverter could be used. The power inverter 414 is controlled by a processor 412, which defines the power level and phase settings for the power inverter 414 output and causes this to vary over time as defined by control inputs 418 and a tilt accelerometer system 410 as described below.

The control inputs 418 can include inputs from a human operator, such as a driver of a vehicle to which the control unit 400 is attached. The control inputs may also include inputs from a computer or other machine if the electric motor is driven by computer software or as part of a computer-implemented process such as a manufacturing, warehousing or distribution system.

A tilt accelerometer system 410 also provides an input to the processor 412 to enable adjustment of the operation of the power provider 414 (and so the external electric motor 416) based on a measure of tilt of the unit.

As illustrated in FIG. 4A, the tilt accelerometer system 410, processor 412 and power provider 414 are implemented as a single unit within a common housing. The three components are electrically and electronically coupled and preferably share a common power source. Preferably, elements of the three components are implemented on a single printed circuit board, PCB. Hence the electric motor control unit 400 is provided as a single coherent unit for attachment to an external electric motor 416 and for coupling to control inputs 418 in a system.

An embodiment of the tilt accelerometer system 410 will now be described in more detail with reference to FIG. 4B. An exemplary tilt accelerometer system includes a tilt accelerometer 450, which optionally comprises a Micro-ElectroMechanical System (MEMS) accelerometer. As set out below in more detail, the tilt accelerometer is preferably a 3 axis accelerometer, providing an output indicating acceleration in 3 dimensions. However, other types of accelerometer, in particular 2 axis accelerometers may be sufficient for some implementations. A motion compensation system is also provided 452 which compensates for motion of the electric motor control unit 400, including motion due to linear speed in the direction of travel, and optionally acceleration in a linear direction, and acceleration due to a change in direction of the control unit. This compensation is described in more detail below.

The outputs from the tilt accelerometer 450 and the motion compensation system 452 are provided to a tilt angle determiner 454, which adjusts the measure of tilt output by the system to accommodate for motion of the electric motor control unit. The adjusted tilt angle is output from the tilt angle determiner 454 and provided as an input to the processor 412 of the electric motor control unit 400 to adjust the operation of the power provider 414 as described above.

Figure 4B:
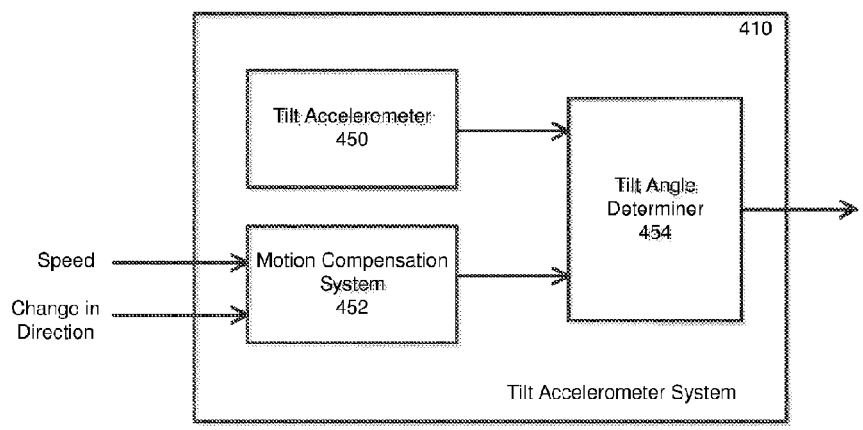
FIG. 4B is a schematic diagram of a tilt accelerometer system according to one embodiment.

Although FIGS. 4A and 4B are illustrated as block diagrams, the functionality of each of the elements described in these drawings need not be provided by a single element. For example, the functionality of one or more of these elements may be shared with other elements, or distributed throughout the apparatus. For example, the tilt angle determiner 454 may be implemented as part of the processor 412 of the electric motor control unit 400, which may then take inputs directly from the tilt accelerometer 450 and the motion compensation system 452. Accordingly, it will be understood that these diagrams should not be taken to imply a necessary physical or functional separation between the elements shown in the drawings.

Use of electric motor control units as described above will now be discussed with particular reference to load-bearing vehicles such as aerial work platforms and fork lift trucks. However, it will be appreciated the electric motor control units described herein may be coupled to any electric motor where it is desirable to control the operation of the electric motor based on a measure of tilt. In particular, a unit may be coupled to an electric motor for any type of vehicle, such as a car, van or public service vehicle. In such situations, the electric motor control unit may be incorporated for example into a safety system to control operation of the vehicle when tilt is detected. Aspects and preferred features of the system described below in relation to load-bearing vehicles may be applied independently to the electric motor control unit and tilt accelerometer systems described above.

Vehicles such as aerial work platforms, and fork lift trucks comprise load bearing lifts which may be used to lift loads to a height sufficient to unbalance the vehicle, or to cause it to tilt or tip over. For example, they may be able to lift a load that is sufficient to move the centre of gravity of the loaded vehicle to a position that does not lie vertically above the footprint of the wheelbase. This would be enough to tip even a stationary vehicle, but in less extreme examples, the lifted load may destabilise the vehicle and cause it to be at risk of tipping during use.

Figure 1:
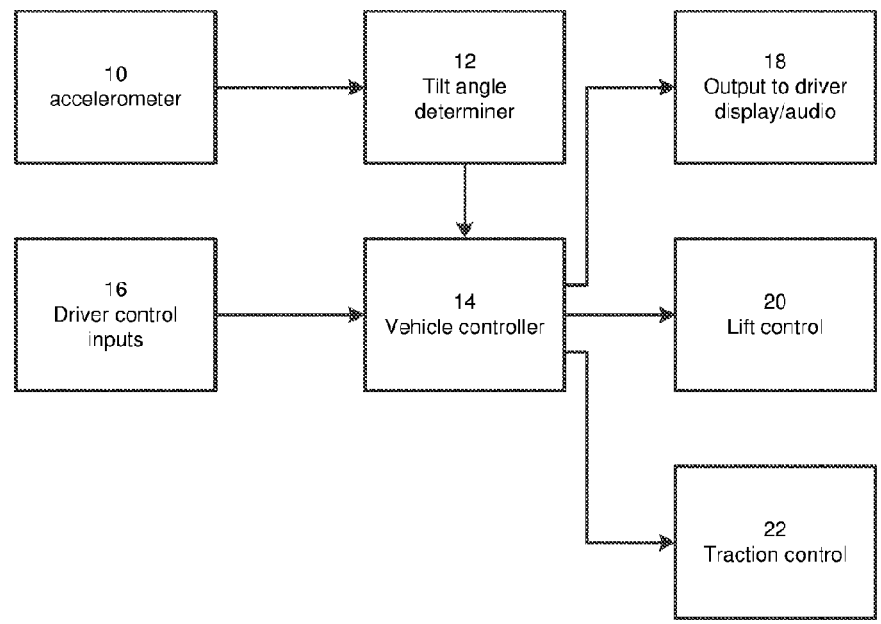
FIG. 1 shows a schematic view of a control system for a vehicle.

FIG. 1 illustrates a control system for use in a vehicle such as fork lift trucks and aerial work platforms or cherry pickers.

The system of FIG. 1 comprises an accelerometer 10 coupled to a tilt determiner 12. The tilt angle determiner is coupled to a controller 14. Driver controls 16 comprise an input interface for receiving commands from an operator of the vehicle, and are also coupled to the controller 14. The controller 14 is coupled to a driver display 18 for providing output to an operator of the vehicle, a lift controller 20, for controlling a load bearing lift, and a traction controller 22 for moving the vehicle.

The accelerometer 10 comprises a 3-axis accelerometer operable to measure the orientation of the accelerometer with respect to the direction of gravity in 3 dimensions. The controller 14 is operable to control the lift control 20 for controlling the lifting of loads, and to control the traction control 22, to control the speed of the vehicle. The driver control 16 is operable to communicate input received from an operator to the controller 14 to enable the operator to control the lift 20 and to drive the vehicle.

The tilt determiner 12 is operable to obtain an indication of the linear speed of the vehicle and the direction in which the vehicle is being driven with respect to its linear speed from the controller 14. The tilt determiner 12 is further operable to adjust the measurements obtained from the accelerometer 10 based on the linear speed, and the direction in which the vehicle is being steered with respect to its direction of travel.

In operation, with the vehicle in motion, the tilt determiner 12 obtains a signal indicating the vehicle's linear speed and a signal indicating the direction in which the vehicle is being steered from the controller 14. The tilt determiner also obtains an acceleration signal from the accelerometer 10. Based on the direction in which the vehicle is being steered with respect to its direction of travel, the tilt determiner 12 infers a radius of the turning circle of the vehicle, and determines a centripetal acceleration based on the radius of the turning circle, and the linear speed. The tilt angle determiner uses this centripetal acceleration to modify the direction of the acceleration measured by the tilt accelerometer 10 to correct the accelerometer measurement to compensate for vehicle motion.

Figure 2:
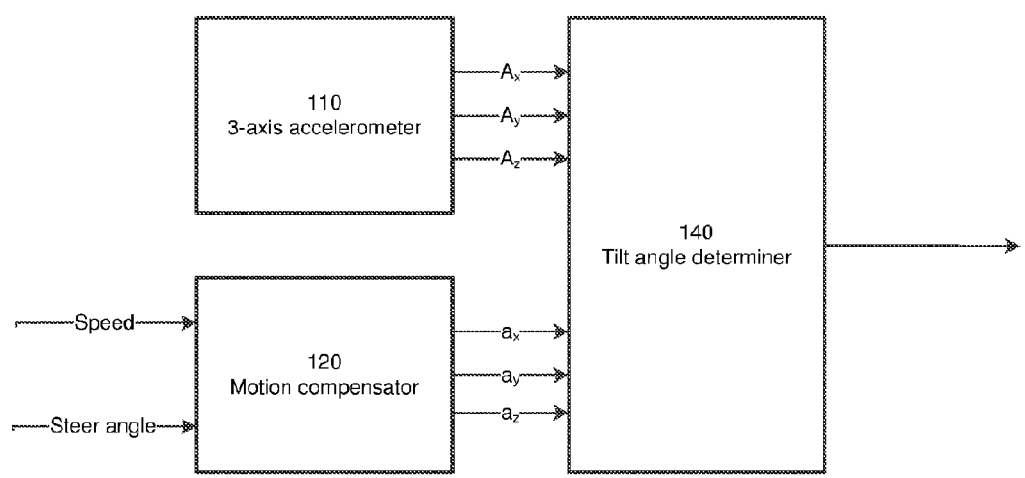
FIG. 2 shows a schematic view of a controller for use in systems such as that illustrated in FIG. 1.

FIG. 2 shows a three axis accelerometer 110, and a vehicle motion compensator 120 coupled to another tilt angle determiner 140.

The three axis accelerometer 110 is operable to provide a three dimensional acceleration signal comprising three components of acceleration Ax, Ay, Az, to the tilt angle determiner 140.

The vehicle motion compensator 120 is operable to obtain a speed signal indicating the linear speed of the vehicle and a steer angle signal indicating the angle at which the vehicle is steered with respect to its direction of travel. Based on the speed signal and the steer angle of the vehicle, the vehicle motion compensator is operable to determine the acceleration associated with the motion of the vehicle, e.g. the vehicle accelerating linearly, or the vehicle being steered through a turn. Accordingly, the vehicle motion compensator 120 is operable to provide a three component signal (e.g. a three dimensional vector) representing the acceleration associated with motion of the vehicle to the tilt angle determiner.

The tilt angle determiner 140 is configured to modify the acceleration measurement $A_x$, $A_y$, $A_z$, provided by the three axis accelerometer by subtracting the acceleration associated with motion of the vehicle $a_x$, $a_y$, $a_z$ to provide a corrected tilt angle measurement.

In operation, the three axis accelerometer provides a 3D acceleration signal to the tilt calculator 140, and the vehicle motion compensator provides a signal representing the acceleration associated with the motion of the vehicle. The tilt angle determiner 140 then corrects the 3D acceleration signal measured by the accelerometer based on the vehicle motion acceleration.

As one example, when the vehicle is vertically upright, and at rest (or moving at constant speed in a straight line), the signal from the three axis accelerometer indicates a vertical acceleration corresponding to the direction in which gravity is acting. In addition, under these conditions the acceleration associated with motion of the vehicle is zero, so the vehicle motion compensator provides a zero output to the tilt angle determiner.

As another example, when the vehicle is vertically upright, and travelling in a straight line but increasing its linear speed, the signal from the three axis accelerometer indicates a vertical acceleration corresponding to the direction in which gravity is acting modified by the linear acceleration of the vehicle. The vehicle motion compensator 120 determines a signal indicating the linear acceleration based on its rate of change of linear speed, and provides this signal $a_x$, $a_y$, $a_z$, to the tilt angle determiner 140. The tilt angle determiner 140 then corrects the signal from the accelerometer $A_x$, $A_y$, $A_z$ based on the signal $a_x$, $a_y$, $a_z$ from the motion compensator, and determines a tilt angle signal based on the corrected signal from the accelerometer (which indicates the direction in which gravity is acting).

Although FIG. 1 and FIG. 2 are illustrated as block diagrams, the functionality of each of the elements described in these drawings need not be provided by a single element. For example, the functionality of one or more of these elements may be shared with other elements, or distributed throughout the apparatus. As another example, the example of FIG. 1 shows a system in which a controller 14 communicates with vehicle systems such as the traction control 22, and driver control inputs 16 to obtain indications of the linear speed and steering angle of the vehicle. Accordingly, the controller 14 of FIG. 1 can incorporate the functionality of the motion compensator 120 shown in FIG. 2. In addition, in the apparatus shown in FIG. 1, a motion compensator 140, such as that shown and described with reference to FIG. 2 may be provided and coupled to the tilt angle determiner 12, so that the vehicle controller 14 need not perform any of the motion compensation functions. Accordingly, it will be understood that these diagrams should not be taken to imply a necessary physical or functional separation between the elements shown in the drawings.

The functionality of the elements of FIGS. 1, 4A and 4B may be provided by analogue or digital components, or mixtures thereof. In some examples the functionality may comprise digital logic, such as combinations of logic gates, field programmable gate arrays, FPGA, application specific integrated circuits, ASIC, a digital signal processor, DSP, or by software loaded into a programmable processor.

The accelerometers 10, 110, 450 have been described as 3 axis accelerometers, but in some examples two axis accelerometers, or one or more single axis accelerometers may be used. The accelerometers may be micro-electromechanical MEMs accelerometers; however any appropriate accelerometer may be used.

Figure 3:
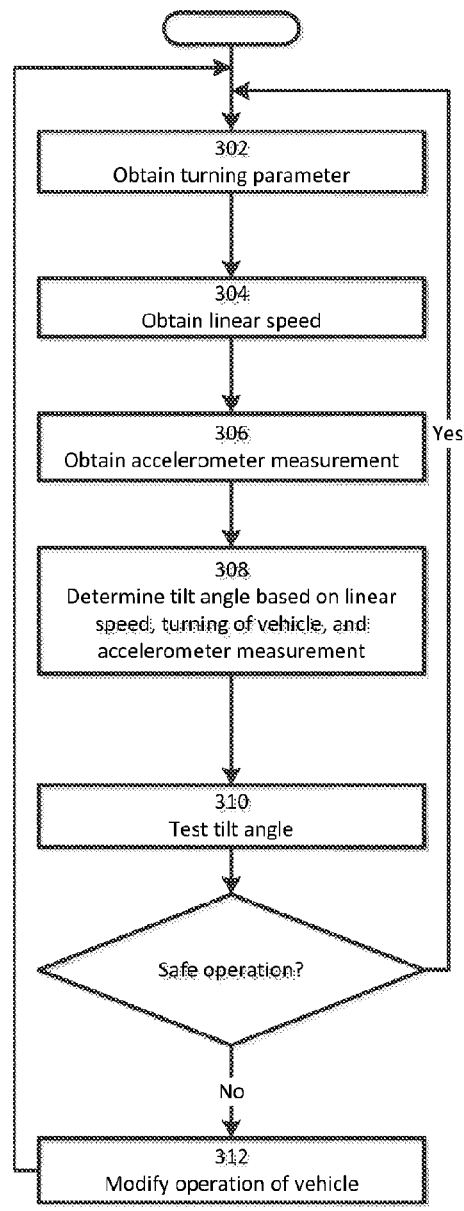
FIG. 3 shows a very schematic illustration of one method of operation of the apparatus and vehicles described with reference to FIG. 1 and FIG. 2.

FIG. 3 illustrates one a method of operation of the apparatus shown in FIGS. 1, 2, 4A and 4B.

In the method shown in FIG. 3, a turning parameter is obtained 302 indicating the turning of the vehicle with respect to its direction of travel. The linear speed in the direction of travel is obtained 304, and optionally the rate of change of linear speed is determined. An accelerometer measurement is then obtained 306 indicating the direction in which gravity is acting with respect to the accelerometer.

The accelerometer measurement is the modified 308 based on the turning parameter, the vehicle's linear speed (and optionally any change in that speed), and the accelerometer measurement, to determine the tilt angle of the vehicle. It is then determined 310 whether the vehicle's tilt angle is within safe limits, and in the event that the vehicle tilt angle is within safe limits, the vehicle is allowed to continue to operate normally. In the event that it is determined that the vehicles operation is not within safe limits, operation of the vehicle is modified based on the determined tilt angle.

To determine whether the vehicle is operating within safe limits, the weight of a lifted load may be taken into account, and the height to which the load is lifter may also be taken into account. For example, the vehicle controller (e.g. controller 14 in FIG. 1) may be configured to determine the position of the center of gravity of the vehicle based on the vehicle's unloaded weight, the weight of the lifted load, and the height to which it has been lifted. In some possibilities, additional sensors on the vehicle may be used to determine the weight of the load and the position of the load. These sensed parameters may be passed to the vehicle controller for example using a CANBUS interface or other communication systems such as a wireless interface or a wiring loom.

The controller may be configured to modify the range of tilt angles which are defined to be safe based on the position of the loaded vehicle's center of gravity, and stored data indicating the size of the vehicle's footprint. Accordingly, the controller may permit operation of the vehicle at a wider range of tilt angles when the loaded center of gravity of the vehicle is lower in height, but apply a more restrictive limit to the tilt angles when the vehicles center of gravity is higher—for example when a heavy load has been lifted.

To modify operation of the vehicle, an audible or visual alert may be provided to the vehicle's operator, or the vehicle's speed may be limited or reduced. Other modifications of the vehicles operation may be applied, such as preventing lifting to a greater height or moving the load further from the centre of gravity It may in some examples be advantageous to calibrate the accelerometer 10, 110, when the apparatus of FIGS. 2 and 3 is assembled to a vehicle. To calibrate the accelerometer, it can be positioned on the vehicle when the vehicle is stationary in a vertically upright position. The apparatus can then be fixed to the vehicle whilst the vehicle is vertical, and determining the acceleration measured by the accelerometer when the vehicle is in this position may enable the controller of the apparatus to be configured to identify when the vehicle is vertically upright.

Amongst the technical problems addressed by aspects of the disclosure could be the provision of efficient data exchange between a tilt sensor and the vehicle traction and/or lift control. In addition, aspects of the disclosure have the advantage that the orientation of the tilt sensor is protected by the orientation of the motor controller thereby reducing the likelihood that the orientation of the tilt sensor can inadvertently be modified.

In some embodiments the motor controller may be integrated with an electric motor into a single unit.

The foregoing examples explain some ways to put the present disclosure into effect, other variations and modifications may be applied, and in particular the functions described above with reference to apparatus may be combined with any method described herein. Equally, the methods described herein may be implemented in apparatus configured to provide equivalent functionality. Other examples and variations will be apparent to the skilled addressee in the context of the present disclosure.

What is claimed is:

1. A method of controlling the operation of an electric motor for a vehicle, the method comprising:
    coupling to the vehicle in a fixed orientation an electric motor control unit, the electric motor control unit comprising an electric motor controller and a tilt accelerometer system, the tilt accelerometer system comprising a tilt accelerometer;
    coupling an output of the electric motor controller to a control input of the electric motor to control the operation of the electric motor; and
    calibrating the tilt accelerometer to define the direction of a gravitational force acting on the tilt accelerometer relative to the fixed orientation of the electric motor control unit.

2. The method of claim 1 further comprising determining a measure of tilt of the vehicle relative to the direction of operation of the gravitational force.

3. The method of claim 1 wherein the electric motor controller comprises a processor and a power inverter, and wherein an output of the power inverter controls the operation of the electric motor.

4. The method of claim 3 wherein the output of the tilt accelerometer system is provided as an input to the processor of the electric motor controller.

5. The method of claim 1 further comprising determining a measure of the linear speed of the vehicle and adjusting the output of the tilt accelerometer based on the measure of the linear speed.

6. The method of claim 1 further comprising determining a turning parameter of the vehicle indicating a change in the direction of travel of the vehicle and adjusting the output of the tilt accelerometer based on the turning parameter.

7. The method of claim 1 wherein calibrating the tilt accelerometer comprises positioning the vehicle in a stationary upright position; determining the acceleration measured by the accelerometer; and configuring the accelerometer to provide a zero tilt output in said position.

8. A controller for an electric motor configured to operate a lifting motor, or a traction motor of a load lifting vehicle and to determine the tilt angle of a vehicle based on the turning angle of the vehicle, the linear speed of the vehicle, and an accelerometer signal.

9. An apparatus for controlling operation of a load bearing vehicle, wherein the vehicle comprises a load bearing lift operable to lift a load to a selected height, wherein the apparatus comprises;
    a turning input for obtaining a turning parameter of the vehicle indicating a change in its direction of travel;
    a speed input for obtaining the linear speed of the vehicle in the direction of travel;
    an accelerometer input for obtaining an accelerometer signal;
    a tilt angle determiner configured to determine the tilt angle of the vehicle based on the turning parameter, the linear speed, and the accelerometer signal; and
    a controller configured to modify operation of the vehicle based on the determined tilt angle;
    wherein the controller is configured to modify the obtained accelerometer signal based on the linear speed and the turning parameter to determine the tilt angle.

10. The apparatus of claim 9 in which modifying the obtained accelerometer signal based on the linear speed and turning parameter comprises determining the centripetal acceleration.

11. The apparatus of claim 10 in which the turning parameter is based on the radius of the turning circle of the vehicle.

12. The apparatus of claim 9 further comprising a steering determiner, coupled to the turning angle input to provide a turning parameter based on the steering of the vehicle.

13. The apparatus of claim 12 in which the steering determiner is configured to determine at least one of: (i) the angle of a steering wheel of the vehicle, and (ii) the angle between the direction of travel of the vehicle and a wheel of the vehicle.

14. The apparatus of claim 9 in which the accelerometer signal comprises a vector quantity indicating the angle of the vehicle with respect to gravity.

15. A method of controlling operation of a load bearing vehicle, wherein the vehicle comprises a load bearing lift operable to lift a load to a selected height, the method comprising:
    obtaining a turning parameter indicating turning of the vehicle with respect to its direction of travel;
    obtaining the linear speed of the vehicle in the direction of travel;
    obtaining the acceleration of the vehicle;
    determining the tilt angle of the vehicle based on the turning parameter, the linear speed, and the acceleration of the vehicle; and
    modifying operation of the vehicle based on the determined tilt angle.

16. The method of claim 15 comprising obtaining at least one parameter related to the load bearing lift and modifying operation of the vehicle based on the determined tilt angle and the at least one parameter.

17. The method of claim 16 in which the at least one parameter is selected from the list comprising: the weight of the load, the height to which the load has been lifted, the unloaded weight of the vehicle, and the position of the centre of gravity of the loaded vehicle.

18. The method of claim 15 in which modifying operation of the vehicle comprises at least one of: providing an audible or visible signal to an operator of the vehicle; limiting the speed at which the vehicle may be driven; and limiting operation of the load bearing lift.

19. A computer program product comprising program instructions operable to program a processor to perform the method of claim 15.

20. A processor configured to perform the method of claim 15.

* * * * *